United States Patent
Seri et al.

(10) Patent No.: US 12,556,564 B1
(45) Date of Patent: Feb. 17, 2026

(54) DETECTION OF ASSETS ACCESSIBLE VIA INBOUND NETWORK TRAFFIC

(71) Applicant: Zafran Security LTD, Tel Aviv (IL)

(72) Inventors: Ben Seri, Ramat Gan (IL); Amir Laks, Berlin (DE)

(73) Assignee: Zafran Security LTD, Tel Aviv (IL)

( * ) Notice: Subject to any disclaimer, the term of this patent is extended or adjusted under 35 U.S.C. 154(b) by 0 days.

(21) Appl. No.: 19/173,436

(22) Filed: Apr. 8, 2025

(51) Int. Cl.
*H04L 9/40* (2022.01)

(52) U.S. Cl.
CPC ...... *H04L 63/1425* (2013.01); *H04L 63/1433* (2013.01)

(58) Field of Classification Search
CPC ............. H04L 63/1425; H04L 63/1433; H04L 63/1416; H04L 63/1441; G06F 21/577
See application file for complete search history.

(56) References Cited

U.S. PATENT DOCUMENTS

| | | | |
|---|---|---|---|
| 7,886,021 B2 | 2/2011 | Scheifler et al. | |
| 9,692,778 B1 | 6/2017 | Mohanty | |
| 10,140,828 B2 | 11/2018 | Johnson et al. | |
| 10,862,907 B1 | 12/2020 | Pon et al. | |
| 10,972,483 B2 | 4/2021 | Thomas et al. | |
| 11,310,132 B2 | 4/2022 | Pon et al. | |
| 11,470,096 B2 | 10/2022 | Muddu et al. | |
| 11,507,672 B1* | 11/2022 | Pagnozzi | ............ H04L 63/0263 |
| 11,627,154 B2 | 4/2023 | Shua | |
| 2014/0013434 A1* | 1/2014 | Ranum | ................. G06F 21/564 726/24 |
| 2019/0251267 A1 | 8/2019 | Wysopal et al. | |
| 2020/0169537 A1* | 5/2020 | Lee | ..................... H04L 63/0236 |
| 2021/0105304 A1* | 4/2021 | Kraning | ................. G06Q 10/08 |
| 2021/0226927 A1* | 7/2021 | Crabtree | ............... G06F 16/951 |
| 2022/0156723 A1* | 5/2022 | Lovato | .................. H04L 9/3236 |
| 2022/0224723 A1 | 7/2022 | Crabtree et al. | |
| 2023/0024436 A1 | 1/2023 | Jayawardena et al. | |

(Continued)

OTHER PUBLICATIONS

Lechevin et al., "Toward a stability monitoring system of an asset-communications network exposed to malicious attacks," Proceedings of the 2011 American Control Conference Year: 2011 | Conference Paper | Publisher: IEEE.*

(Continued)

*Primary Examiner* — Roderick Tolentino
(74) *Attorney, Agent, or Firm* — M&B IP Analysts, LLC (57) ABSTRACT

A system and method for exposure remediation. A method includes analyzing access logs for assets deployed in a computing environment with respect to network traffic in order to identify an indicator of a network access event involving an inbound connection from an external network. The at least one external network is external to the computing environment. The inbound connection includes at least some network traffic being transmitted to the computing environment from the external network. Network configurations of the assets are analyzed in order to identify indicators of a network configuration which enables the assets to be accessed with the external network. A network-facing asset is detected based on the network traffic and the network configurations. The network-facing asset is accessible via the inbound connection and the external network. An exposure is remediated with respect to the network-facing asset.

19 Claims, 5 Drawing Sheets

(56) References Cited

U.S. PATENT DOCUMENTS

| | | | |
|---|---|---|---|
| 2023/0134632 A1 | 5/2023 | Miller et al. | |
| 2023/0275909 A1* | 8/2023 | Shivamoggi | H04L 63/1441 726/23 |
| 2024/0356799 A1* | 10/2024 | Connor | H04L 41/085 |
| 2025/0047701 A1* | 2/2025 | Siddam | H04L 41/22 |
| 2025/0233884 A1* | 7/2025 | Sherr Lurie | G06F 21/577 |

OTHER PUBLICATIONS

Alonge et al., "Information Asset Classification and Labelling Model Using Fuzzy Approach for Effective Security Risk Assessment," 2020 International Conference in Mathematics, Computer Engineering and Computer Science (ICMCECS) Year: 2020 | Conference Paper | Publisher: IEEE.*

* cited by examiner

DETECTION OF ASSETS ACCESSIBLE VIA INBOUND NETWORK TRAFFIC

TECHNICAL FIELD

The present disclosure relates generally to reachability analysis, and more specifically to detecting assets accessible via inbound traffic.

BACKGROUND

Reachability analysis is a process of identifying accessible code paths in computing infrastructures or otherwise in code which may aid developers and security teams in understanding potentially exploitable vulnerabilities. Reachability analysis may involve identifying certain components of a computing environment and determining whether and to which other systems those components might be exposed, either directly through a connection or indirectly through connections to other systems.

One particular area of interest in reachability analysis may be to identify components which are exposed to the Internet. Many cyber threats come from systems which are external to a computing environment, and their attacks often are realized via the Internet. In this regard, so-called Internet-facing assets (assets which are accessible via inbound network connections realized at least partially through the Internet) make up a part of the attack surface for a computing environment or organization. Determining which components are exposed to the Internet may therefore help in ensuring that components within a computing environment are properly secured against potential cyber threats.

Techniques for detecting Internet-facing assets or assets otherwise accessible via inbound traffic would therefore be desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for exposure remediation. The method comprises: analyzing access logs for a plurality of assets deployed in a computing environment with respect to network traffic in order to identify an indicator of at least one network access event involving an inbound connection of at least one inbound connection to at least one external network, wherein the at least one external network is external to the computing environment, wherein the inbound connection of each network access event includes at least a portion of the network traffic being transmitted to the computing environment from the at least one external network; analyzing a plurality of network configurations of the plurality of assets in order to identify at least one indicator of a network configuration which enables at least a portion of the plurality of assets to be accessed with the at least one external network; detecting at least one network-facing asset among the plurality of assets based on the network traffic and the plurality of network configurations of the plurality of assets, wherein each network-facing asset is accessible via the at least one inbound connection and the at least one external network; and remediating at least one exposure with respect to the detected at least one network-facing asset.

Certain embodiments disclosed herein also include a non-transitory computer-readable medium having stored thereon causing a processing circuitry to execute a process, the process comprising: analyzing access logs for a plurality of assets deployed in a computing environment with respect to network traffic in order to identify an indicator of at least one network access event involving an inbound connection of at least one inbound connection to at least one external network, wherein the at least one external network is external to the computing environment, wherein the inbound connection of each network access event includes at least a portion of the network traffic being transmitted to the computing environment from the at least one external network; analyzing a plurality of network configurations of the plurality of assets in order to identify at least one indicator of a network configuration which enables at least a portion of the plurality of assets to be accessed with the at least one external network; detecting at least one network-facing asset among the plurality of assets based on the network traffic and the plurality of network configurations of the plurality of assets, wherein each network-facing asset is accessible via the at least one inbound connection and the at least one external network; and remediating at least one exposure with respect to the detected at least one network-facing asset.

Certain embodiments disclosed herein also include a system for exposure remediation. The system comprises: a processing circuitry; and a memory, the memory containing instructions that, when executed by the processing circuitry, configure the system to: analyzing access logs for a plurality of assets deployed in a computing environment with respect to network traffic in order to identify an indicator of at least one network access event involving an inbound connection of at least one inbound connection to at least one external network, wherein the at least one external network is external to the computing environment, wherein the inbound connection of each network access event includes at least a portion of the network traffic being transmitted to the computing environment from the at least one external network; analyzing a plurality of network configurations of the plurality of assets in order to identify at least one indicator of a network configuration which enables at least a portion of the plurality of assets to be accessed with the at least one external network; detecting at least one network-facing asset among the plurality of assets based on the network traffic and the plurality of network configurations of the plurality of assets, wherein each network-facing asset is accessible via the at least one inbound connection and the at least one external network; and remediating at least one exposure with respect to the detected at least one network-facing asset.

Certain embodiments disclosed herein include a method, non-transitory computer-readable medium, or system as noted above or below, further including or being configured to perform the following step or steps: creating a routing graph, wherein the routing graph represents connections between the plurality of assets and a plurality of routing elements, wherein the routing graph further represents connections between the plurality of routing elements and the at least one external network, wherein the at least one network-facing asset is detected based further on the routing graph.

Certain embodiments disclosed herein include a method, non-transitory computer-readable medium, or system as noted above or below, further including or being configured to perform the following step or steps: identifying at least one path between the plurality of assets and the at least one external network, wherein the at least one network-facing asset is detected based further on the identified at least one path.

Certain embodiments disclosed herein include a method, non-transitory computer-readable medium, or system as noted above or below, further including or being configured to perform the following step or steps: generating at least one display element showing the identified at least one path; and sending the at least one display element for display via a user interface.

Certain embodiments disclosed herein include a method, non-transitory computer-readable medium, or system as noted above or below, further including or being configured to perform the following step or steps: identifying the inbound connection of each of the at least one network access event based on a network address of a source of the at least a portion of the network traffic being transmitted to the computing environment from the at least one external network.

Certain embodiments disclosed herein include a method, non-transitory computer-readable medium, or system as noted above or below, further including or being configured to perform the following step or steps: identifying at least one set of code executed on at least one asset of the plurality of assets based on the analyzed access logs; and identifying at least one matching fingerprint of the at least one set of code executed on the at least one asset, wherein each matching fingerprint matches a fingerprint of a respective network scanner of a plurality of network scanners, wherein the at least one network-facing asset is detected based further on the identified at least one matching fingerprint.

Certain embodiments disclosed herein include a method, non-transitory computer-readable medium, or system as noted above or below, further including or being configured to perform the following step or steps: identifying at least one network certificate for the plurality of assets, wherein the at least one network-facing asset is detected based further on the identified at least one network certificate.

Certain embodiments disclosed herein include a method, non-transitory computer-readable medium, or system as noted above or below, wherein the plurality of network configurations of the plurality of assets includes a plurality of tags, wherein at least a portion of the plurality of tags indicate that at least one asset of the plurality of assets is network-facing, wherein the at least one network-facing asset is detected based further on the at least a portion of the plurality of tags which indicate that the at least one asset is network-facing.

Certain embodiments disclosed herein include a method, non-transitory computer-readable medium, or system as noted above or below, wherein the plurality of network configurations of the plurality of assets include at least one network identifier owned by at least one asset of the plurality of assets, wherein the at least one network-facing asset is detected based further on the at least one network identifier owned by the at least one asset.

Certain embodiments disclosed herein include a method, non-transitory computer-readable medium, or system as noted above or below, wherein the at least one network-facing asset is detected based further on a time of each of the at least one network access event and a time of analyzing the plurality of network configurations.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The various disclosed embodiments include techniques for detecting assets accessible via inbound network traffic such as assets accessible via the Internet. Various disclosed embodiments allow for identifying assets which can be reached via inbound connections or otherwise via inbound traffic, and may be further used to remediate exposures or potential vulnerabilities which may occur when certain assets or assets having certain configurations are exposed to inbound network traffic.

In particular, the detection techniques may allow for gaining visibility into assets accessible via inbound traffic even when such inbound traffic is transmitted over one or more layers between the asset and external networks such as the Internet. For example, layers such as routers, firewalls, load balancers, intrusion prevention systems (IPSs), intrusion detection systems (IDSs), and the like, may effectively obfuscate inbound network connections in a manner that presents challenges to effectively securing assets against malicious inbound network traffic. The detection techniques described herein allow for identifying connections which may be used to access assets via inbound network traffic despite such layers between the asset and any external networks.

It is noted that some organizations maintain documentation regarding the layers between assets and external networks. However, this documentation requires manually tracking systems such as routers and firewalls. Modern computing environments tend to evolve rapidly, so this documentation can quickly become stale. Additionally, the person manually tracking these systems may lack visibility into them and therefore may miss some of them.

Moreover, using a combination of dynamic traffic-based indicators and static configuration-based indicators for detecting assets which are Internet-facing or otherwise accessible via inbound network traffic improves accuracy of such detection, which in turn improves security in computing environments where detections of such assets are used to secure the environment (for example, by performing remediation actions). Using configuration-based indicators, and in particular indicators based on evidence such as graphs of routing elements, may allow for more accurately identifying certain traffic as originating from external networks and therefore may be utilized to reduce the number of false negatives where assets are identified as not being network-facing when those assets actually are network-facing.

Further, using traffic-based indicators in addition to configuration-based indicators may aid in identifying potential network-facing assets even when the full graph of connections between those assets and external networks is unknown or cannot be created using available static indicators. In this regard, it is noted that many organizations lack complete mappings of the routing elements used to route traffic coming into and going out of their computing environments. Traffic-based indicators which demonstrate routes of traffic may aid in identifying potential network accessibility despite certain gaps in these paths.

Likewise, using traffic-based indicators in addition to configuration-based indicators allows for reducing the number of false positives where assets are identified as being network-facing when they actually are not. In this regard, it is noted that an asset which appears to be connected to the Internet or another network via a series of routing elements as reflected in configuration data may not actually be accessible via inbound traffic, for example when the asset may send outbound traffic to those networks but the computing environment is configured in a way such that the asset does not receive inbound traffic from those networks. Traffic data may therefore aid in identifying whether the asset actually receives inbound traffic, thereby reducing false positives.

Figure 1:
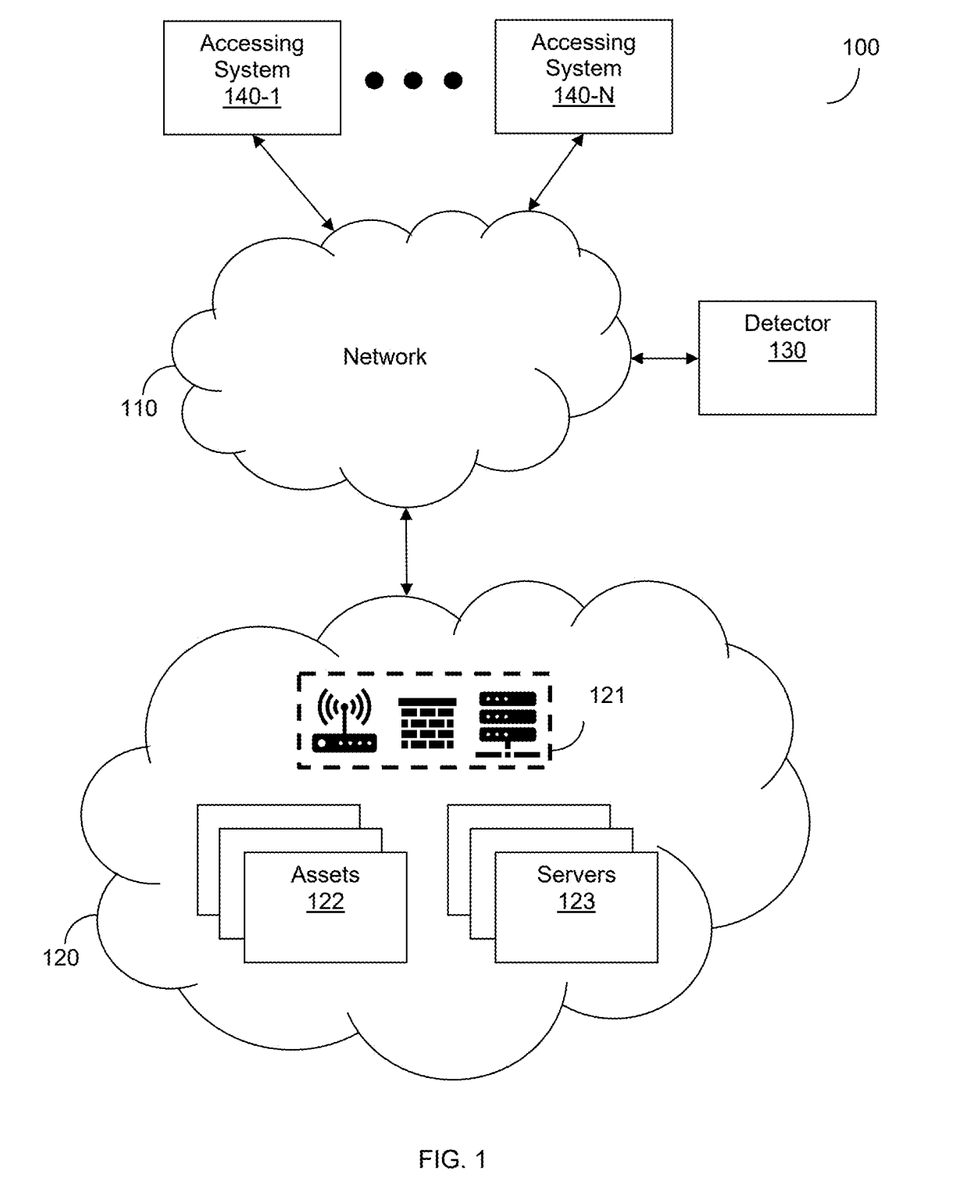
FIG. 1 is a network diagram utilized to describe various disclosed embodiments.

FIG. 1 shows an example network diagram 100 utilized to describe the various disclosed embodiments. In the example network diagram 100, a computing environment 120, a detector 130, and accessing systems 140-1 through 140-N (hereinafter referred to individually as an accessing system 140 and collectively as accessing systems 140, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The computing environment 120 may include, but is not limited to, a set of routing elements 121, a set of assets 122, and a set of servers 123.

The routing elements 121 are configured to aid in routing traffic coming into or within the computing environment 120 such as, but not limited to, traffic coming to the computing environment 120 via the network 121, traffic between the servers 123 and the assets 122, traffic among the assets 122 or among the servers 123, combinations thereof, and the like. The routing elements 121 may be or may include, but are not limited to, routers, firewalls, load balancers, intrusion prevention systems (IPSs), intrusion detection systems (IDSs), application programming interface (API) gateways, content delivery networks (CDNs), web application firewalls (WAFs), combinations thereof, and the like.

As noted above, routing elements or other intermediaries between an inbound source of network traffic such as the network 110 and targets of requests among the traffic such as the assets 122 may effectively obscure the inbound nature of the traffic. That is, traffic which initially enters the computing environment 120 from an external system or network (for example, the network 110) may be routed to one of the servers 123 or one of the assets 122 such that the traffic may appear to be internal traffic at its destination.

Access logs or other data maintained within the computing environment 120 may therefore inaccurately represent inbound network traffic as internal traffic originating within the computing environment 120, which may hinder identification of Internet-facing assets or other assets which may be accessible via inbound network traffic and therefore hinder remediating vulnerabilities related to such inbound network traffic or otherwise remediating exposures to external networks via inbound network traffic. In other words, layers between the Internet or other networks and assets may effectively obfuscate inbound network connections such that assets may be incorrectly identified as being inaccessible to inbound network traffic.

These challenges may be further complicated when the computing environment 120 is realized as a hybrid environment with some assets among the assets 122 being realized via cloud computing (for example, assets stored in servers accessible via networks) and other assets among the assets 122 being realized via local computing resources. Such a hybrid environment may include additional layers of routing, for example, in the form of additional routing elements 121.

The assets 122 may be or may include any data, devices, systems, or other components of the computing environment 120 which are utilized to support data-related activities. The assets 122 may be realized via hardware (for example, servers or switches), software (for example, applications or services), data, a combination thereof, and the like. To this end, the assets 122 may be or may include, but are not limited to, servers (for example, servers which themselves are accessible via the servers 123), databases, software containers, virtual machines, switches, applications, network devices, data, combinations thereof, and the like.

The servers 123 are configured to respond to requests for access or services realized via the computing environment 120. Such requests may be or may include requests involving accessing assets among the assets 122. At least some such requests may be received via inbound traffic which is received from outside of the computing environment 120 such as, but not limited to, inbound network traffic transmitted via the network 110 or other inbound traffic received via the Internet. As noted above, such traffic may originate from malicious entities or systems controlled by malicious entities.

In accordance with various disclosed embodiments, the servers 123, the assets 122, or both, may store data related to access events defined with respect to the assets 122. Such access events may be or may include, but are not limited to, access of the assets 122 or attempts to access the assets 122. Such data may be recorded in access logs (not shown) which indicate aspects of the access event such as, but not limited to, time of the event, duration of the event, identifiers of accessing entities (for example, network identifiers such as Internet Protocol addresses), combinations thereof, and the like.

The detector 130 is configured to detect assets which are accessible via inbound traffic as discussed herein. More specifically, the detector 130 may be configured to determine which assets among the assets 122 are Internet-facing or otherwise accessible via inbound traffic (for example, traffic realized via the network 110) in order to secure the computing environment 120. To this end, in accordance with various disclosed embodiments, the detector 130 is configured to utilize a combination of static and dynamic indicator-based techniques in order to detect assets as accessible via inbound network traffic. In accordance with various further embodiments, the detector 130 may be configured to perform remediation actions in order to remediate potential exposures of assets detected to external networks via inbound network traffic.

The accessing systems 140 are configured to access the assets 122 via the network 110, for example by sending requests to the servers 123 for such access or otherwise requesting data or services from the servers 123. When the accessing systems 140 are operated by malicious entities, such access may enable unauthorized access to the assets 122 or otherwise to the computing environment 120. Activities performed within the computing environment based on requests from the accessing systems 140 may be recorded in one or more access logs (not shown), which in turn may be utilized to detect assets accessible via inbound network traffic in accordance with at least some disclosed embodiments.

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure.

Figure 2:
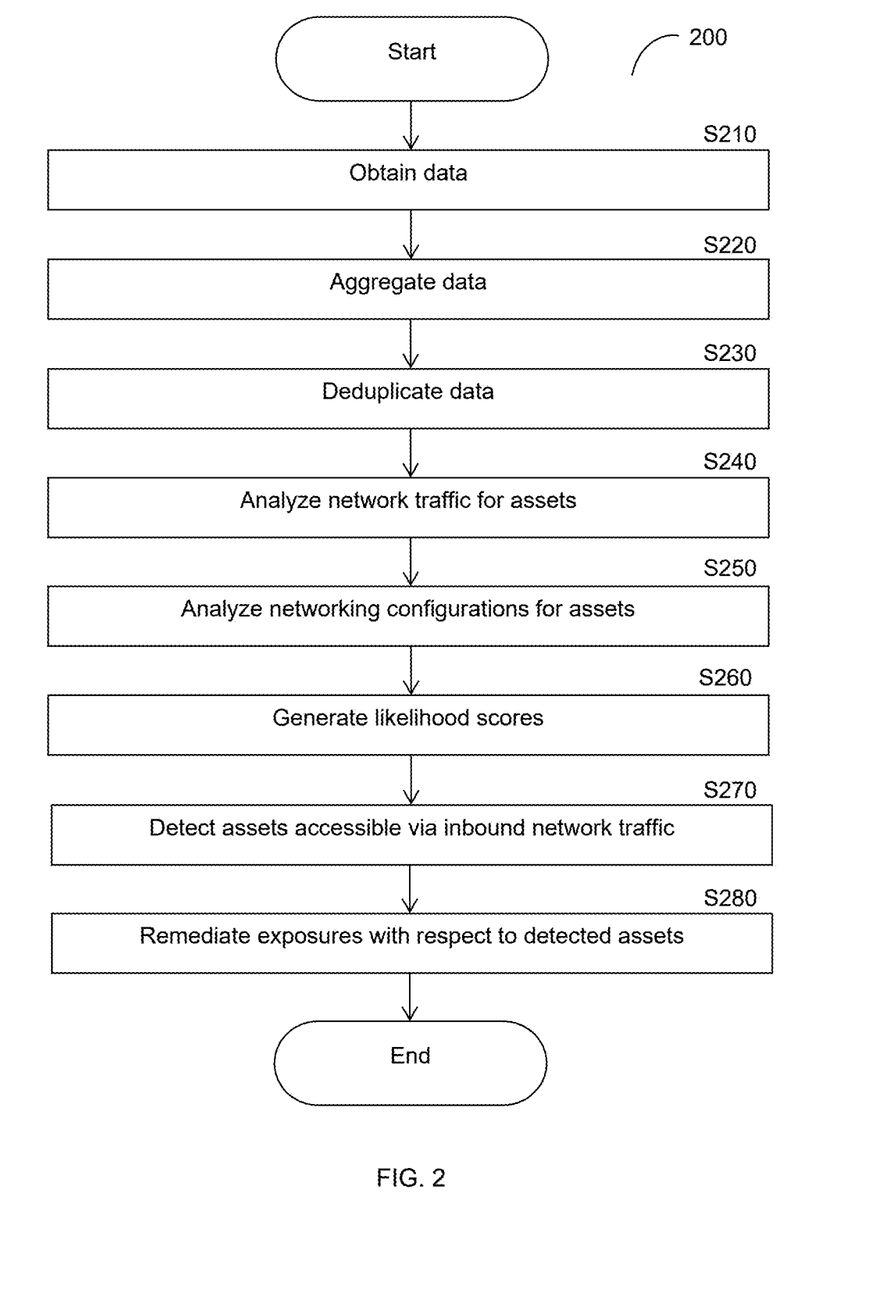
FIG. 2 is a flowchart illustrating a method for detecting assets accessible via inbound network traffic according to an embodiment.

FIG. 2 is a flowchart 200 illustrating a method for detecting assets accessible via inbound network traffic according to an embodiment. In an embodiment, the method is performed by the detector 130, FIG. 1.

At S210, data is obtained. The obtained data may include, but is not limited to, data related to access events involving one or more assets to be protected (for example, assets within a computing environment such as the assets 122 of the computing environment 120, FIG. 1). In an embodiment, the data is obtained from multiple sources.

In an embodiment, the obtained data includes network traffic data and network configuration data. The network traffic data may be used to derive dynamic indicators of inbound network accessibility of assets. The network configuration data may be used to derive static indicators of inbound network accessibility of assets. By utilizing such network traffic data and network configuration in tandem, Internet-facing assets or other assets which are accessible via inbound network traffic may be detected more accurately, that is, while reducing false positives (identifying assets as accessible via inbound network traffic which are not actually accessible by such traffic), false negatives (identifying assets as inaccessible via inbound network traffic when they actually are accessible by such traffic), or both.

In an embodiment, the network traffic data includes network traffic or results of network traffic monitoring which may be related to one or more network connections of components within a computing environment (for example, the computing environment 120, FIG. 1) and may be or may include data related to access events involving assets within the computing environment such as access of or attempts to access those assets. The network traffic data may be obtained by scanning servers (for example, the servers 123, FIG. 1) within a computing environment or otherwise may be obtained from such servers.

To this end, in a further embodiment, the network traffic data is or includes access logs for assets deployed in a computing environment. Such access logs may indicate network access events. In accordance with various disclosed embodiments, at least some of the network access events involve an inbound connection from an external network, where the external network is external to the computing environment for which the access logs are created (for example, a computing environment in which the assets represented in those access logs are deployed). Such inbound connections include network traffic being transmitted to the computing environment from such an external network, that is, traffic coming into the computing environment that originated elsewhere (for example, from the external network or from a system communicating via the external network).

The network traffic data may be or may include dynamic evidence in the form of data which may include potential indicators of inbound network traffic accessibility. Such data may include, but is not limited to, event data indicating network connection events (for example, events involving establishing or communicating via network connections), log data indicating identifiers of scanners or other entities which accessed or attempted to access assets and which are known to use network connections for such access, network certificates used for network communications, combinations thereof, and the like.

In an embodiment, the network configuration data at least includes network configurations of the assets. In a further embodiment, the network configuration data also includes data indicating routing elements connected to the assets (either directly or through other routing elements) which may be utilized to create a graph or otherwise map potential connections between assets and networks through such routing elements.

To this end, the network configuration data may be or may include tags or other data collected via tagging (for example, tags which explicitly indicate whether an asset is intended to be deployed in a manner that is accessible via inbound network traffic), routing configuration data or other data indicating routing elements through which traffic in a computing environment is routed from external networks, network identifiers associated with assets, combinations thereof, and the like.

At S220, the data is aggregated. In an embodiment, data from different sources is aggregated into a joined set of data. This aggregation allows for deduplicating potential duplicate data prior to subsequent processing.

At S230, the data is deduplicated. In an embodiment, deduplicating the data includes identifying redundant portions of data. In a further embodiment, deduplicating the data includes applying deduplication rules which define such redundant portions of data, for example, with respect to certain values, data types, formats, fields, combinations thereof, and the like. Deduplicating the data in this manner allows for reducing the amount of data to be analyzed for static and dynamic indicators as described herein.

At S240, the obtained network traffic data is analyzed with respect to assets. Analyzing the network traffic data with respect to the assets allows for identifying dynamic indicators of potential inbound network communications, that is, indicators that a given asset may be accessible via inbound network traffic which is unearthed by analyzing dynamic activities involving access or attempts to access the asset at runtime. To this end, analyzing the network traffic data may include, but is not limited to, analyzing network connection events to identify events involving inbound network connections, analyzing logs for fingerprints of systems known to access assets via inbound network traffic, identifying cryptographic certificates used for network activities, a combination thereof, and the like.

An example process for analyzing network traffic data with respect to assets in order to derive dynamic indicators of accessibility via inbound network traffic is described further below with respect to FIG. 3.

At S250, the obtained network configuration data is analyzed in order to derive static indicators of inbound network traffic accessibility. Analyzing the network configuration data with respect to the assets allows for identifying static indicators of potential inbound network communications, that is, indicators that a given asset may be accessible via inbound network traffic may be unearthed by analyzing static configurations related to network connections or otherwise which may be utilized to facilitate transmission of inbound network traffic. To this end, analyzing the network configuration data may include, but is not limited to, analyzing tags of assets, reconstructing or otherwise creating routing graphs demonstrating routing paths from external networks, identifying network identifier owned by assets, combinations thereof, and the like.

An example process for analyzing network traffic data with respect to assets in order to derive static indicators of accessibility via inbound network traffic is described further below with respect to FIG. 4.

At S260, likelihood scores are generated based on the analysis of the network traffic data and the network configuration data. In an embodiment, each likelihood score represents a likelihood that a respective asset is accessible via inbound network connections (for example, if the assets is Internet-facing or otherwise network-facing such that the asset is accessible via inbound network connections).

In a further embodiment, each likelihood score is determined based on multiple indicators and, in particular, a combination of indicators including both dynamic indicators and static indicators. To this end, each likelihood score may be an aggregated or weighted aggregate score generated using values representing respective factors.

The values representing factors may be determined based on indicators collected for each factor (for example, indicators representing a network configuration or traffic behavior of that factor). For a weighted aggregate score, the value representing each such factor may be assigned a corresponding weight, and each weight is applied to the corresponding value as part of generating the likelihood scores.

In accordance with various disclosed embodiments, each likelihood score is generated based on a combination of indicators and, specifically one or more static indicators determined based on network configuration data and one or more dynamic indicators determined based on network traffic data. That is, in an embodiment, the likelihood scores are generated based on a combination of static and dynamic factors such that the likelihoods represented by those likelihood scores reflect both statically observable configurations (for example, routing configurations) related to network communications as well as dynamically observed traffic. As noted above, this combination of network configuration and network traffic allows for reducing both false positives and false negatives with respect to identifying network-facing assets that are accessible via inbound network traffic.

In a further embodiment, the likelihood scores are generated based further on times associated with respective indicators. More specifically, such times may be or may include times at which evidence used to determine values for those indicators is collected. That is, evidence which is older may be utilized differently for determining values of indicators than evidence which is newer.

To this end, in yet a further embodiment, older evidence or otherwise values of indicators determined based on older evidence may be assigned a lower weight than newer evidence or values of indicators determined based on newer evidence. In such an embodiment, the resulting combination of value and weight for evidence that is older may be lower as compared to the combination of the same value and a different weight for evidence which is newer. That is, newer evidence and indicators derived from newer evidence may be assigned higher weights than older evidence such that newer evidence will tend to have more impact on the likelihood score than older evidence. Accordingly, in an embodiment, S260 further includes determining weights for different factors based on the time of evidence collection for the respective evidence used to determine the values for those factors.

In another embodiment, certain older evidence may be determined to be "stale" such that indicators whose values are determined using the older evidence or otherwise which are derived from the older evidence may also be determined to be "stale" when the evidence was collected over a threshold amount of time prior to generation of the likelihood scores, and such stale indicators may be ignored or otherwise not used to generate likelihood scores. To this end, in some embodiments, S260 further includes determining such stale evidence that is older than a threshold amount of time and using only "fresh" evidence (i.e., evidence which is not determined to be stale or otherwise which was collected less than a threshold amount of time prior to generating likelihood scores) may be utilized for the generation of likelihood scores. More specifically, indicators derived from such stale evidence may not be factored into generation of likelihood scores, for example by ignoring those indicators based on stale evidence when determining values for indicators to be used in generating likelihood scores.

In this regard, it is noted that timing of when evidence is collected is relevant to whether that evidence accurately reflects a current network-facing status of a given asset. That is, stale evidence may tend to inaccurately portray whether an asset is currently accessible via inbound network traffic. In particular, assets may be temporarily connected in ways that previously enabled those assets to be accessed via inbound network traffic such that evidence suggesting that those assets are accessible via inbound network traffic remains collected well before the asset is analyzed for network-facing status. Ignoring or assigning lower weights to stale evidence may therefore improve accuracy of network-facing asset detection, which in turn improves security of the computing environment while minimizing remediation actions needed to correct issues with assets falsely identified as being accessible via inbound network traffic.

At S270, one or more network-facing assets are detected. In an embodiment, each network-facing asset is accessible via inbound network traffic transmitted to a computing environment including the asset. Such an inbound network connection allows traffic to enter the computing environment from one or more external networks such as, but not limited to, the Internet.

In accordance with various disclosed embodiments, the network-facing assets are detected based on a combination of static indicators (for example, indicators derived using evidence among network configuration data) and dynamic indicators (for example, indicators derived using evidence among network traffic data). As noted above, using a combination of static configuration-based indicators and dynamic traffic-based indicators allows for improving accuracy of network-facing asset detection as compared to using either type of indicator in isolation.

In an embodiment, each network-facing asset is an asset for which the likelihood score is above a threshold (for example, a predetermined threshold). When each likelihood score is generated based on multiple factors including at least some factors determined based on static indicators and at least some factors determined based on dynamic indicators, the network-facing assets are therefore detected based on a combination of static and dynamic indicators.

At S280, exposures are remediated with respect to the detected network-facing assets. In an embodiment, each exposure is an exposure of one of the detected network-facing assets to an external network via an inbound connection. That is, each exposure exposes one of the network-facing assets to an external network such that inbound communications from the external network are capable of reaching that network-facing asset.

In an embodiment, remediating the exposures includes performing one or more remediation actions with respect to the network-facing assets. In a further embodiment, the remediation actions include actions performed in order to prevent or reduce requests or other communications with the network-facing assets which come from external networks. Consequently, the remediation actions may be used to avoid or to mitigate potential vulnerabilities which might arise from certain exposures (for example, exposures to external networks generally or exposures to specific external networks).

To this end, the remediation actions may be or may include, but are not limited to, terminating one or more connections to network-facing assets (for example, terminating a connection between a network-facing asset and a server along a path between the network-facing asset and the Internet), modifying a network configuration of one or more network-facing assets (for example, to prevent the asset from processing data received via networks or to only allow processing of data received via internal networks within a computing environment in which the asset is deployed), both, and the like.

In some embodiments, the remediation actions to be performed with respect to each detected network-facing asset may be determined based further on a severity of exposure of the network-facing asset. In a further embodiment, the severity of exposure of each network-facing asset is determined based on a type of network to which the asset is exposed, a reach or depth of the network to which the asset is exposed, or both. That is, for each network-facing asset accessible via an inbound connection to an external network such that the asset is exposed to that external network, the severity of the exposure of that asset for cybersecurity purposes may be defined based on what kind of external network the asset is exposed to, reach defined with respect to how many other networks and systems could the asset potentially be exposed via the external network, or both.

The type of the external network may be defined as or with respect to network types such as, but not limited to, personal area networks, campus networks, storage area networks, metropolitan area networks, system area networks, local area networks (LANs), wide area networks (WANs), operational technology (OT) networks, information technology (IT) networks, combinations thereof, and the like.

Using the type of the network, reach of the network, or both, may allow for more accurately analyzing the risk of exposure of the network-facing asset. That is, certain types of networks may present more risk of exposure to potentially malicious devices or systems than other types of networks. Likewise, networks which have more reach such that they connect to more other networks and systems present higher risk of exposure to potentially malicious devices or systems than networks with less reach. Accordingly, using type or reach of network to determine remediation actions may reduce use of computing resources needed to secure assets while maximizing security by effectively reducing the number of assets to be secured or otherwise reducing the number of remediation actions to be performed while maintaining acceptable levels of security within a computing environment.

Figure 3:
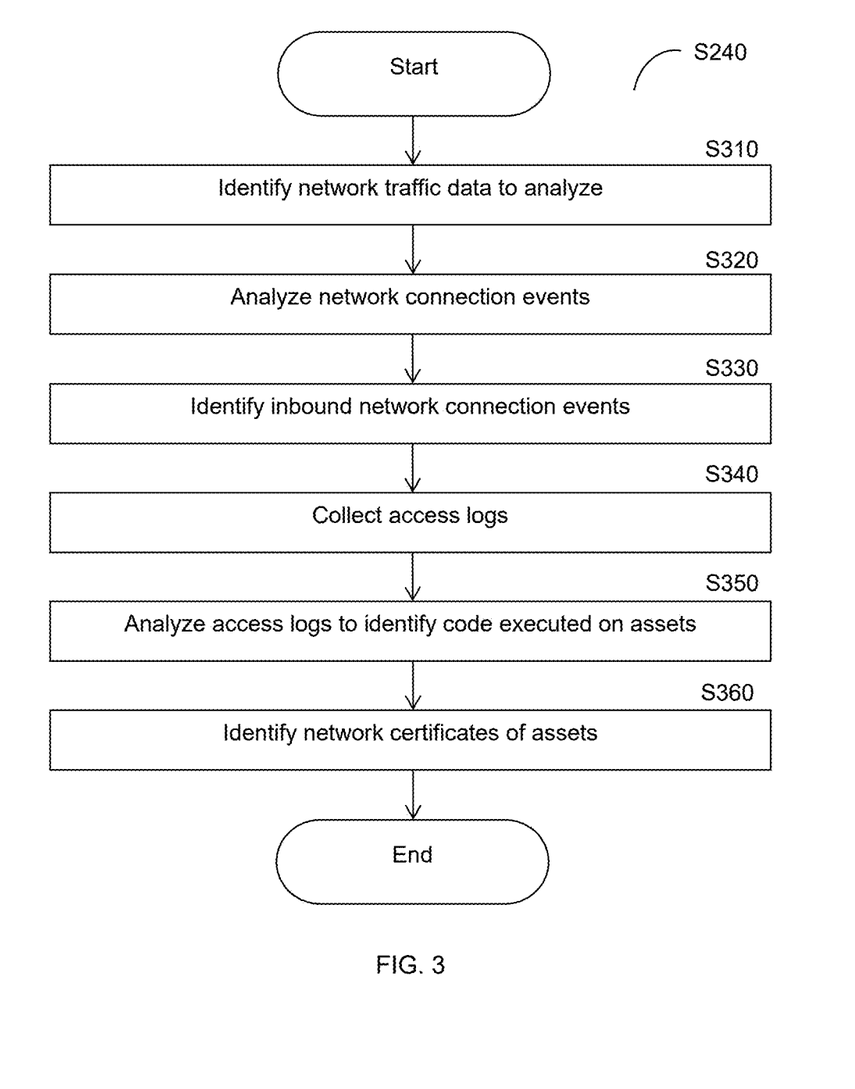
FIG. 3 is a flowchart illustrating a method for analyzing network traffic for assets according to an embodiment.

FIG. 3 is a flowchart S240 illustrating a method for analyzing network traffic for assets according to an embodiment.

At S310, network traffic data to analyze is identified. The network traffic data includes data related to traffic coming in to a computing environment in which one or more assets are deployed, going out of the computing environment, or both. At least a portion of the network traffic data may be obtained from servers (for example, the servers 123, FIG. 1).

At S320, network connection events are analyzed. The network connection events may be or may include events including establishing connections to external networks, using connections to external networks (for example, to transmit or receive data), both, and the like.

In an embodiment, S320 further includes checking network addresses (for example, IP addresses) represented in data related to network connection events. In a further embodiment, the network addresses are checked in order to determine whether each network address is a full address or a subset of an address, for example based on a format of the network address. As a non-limiting example, a full IP address may be used as evidence that an asset is Internet-facing because full IP addresses are used for Internet communications, while a subset of an IP address may be used as evidence that an asset is not Internet-facing because subset IP addresses tend to be used internally only and not for inbound Internet traffic.

Alternatively or in combination, S320 may further include analyzing network addresses in order to determine classes of network addresses and determining whether a number of events involving both a given asset and unique network address of that class is above a threshold (for example, a predetermined threshold number or proportion of events). As a non-limiting example, IP addresses indicated among the network traffic data may be analyzed to identify Class A IP addresses in order to determine that two unique Class A IP addresses are represented in the network traffic data related to a given asset due to their unique first digits (for example, "1" of "1.2.3.4" and "2" of "2.3.4.5" may be identified as unique because they have different first digits). In this regard, it is noted that having a high (for example, above a threshold) number of unique network addresses represented in network traffic data related to communications with a given asset may be used as evidence that the asset is network-facing.

At S330, inbound network connection events are identified based on the analysis of the network connection events. In an embodiment, the network connection events are analyzed in order to identify whether each event relates to an inbound connection. For example, the events may be analyzed to determine whether the event relates to a network connection used to receive data within the computing environment, where network connections used to receive data are identified as inbound network connections. In other words, network connections used only to transmit data out of the computing environment may be determined not to be inbound network connections. Network connection events involving both a given asset and an inbound connection can be used as evidence that the asset is network-facing, i.e., accessible via inbound connections.

At S340, access logs are collected from among the network traffic data. More specifically, in an embodiment, the collected access logs are access logs indicating assets which were accessed or attempted to be accessed, for example through one or more servers. That is, each such access log is an access log which records events related to access or attempts to access a corresponding asset. Such access logs may include data such as, but not limited to, fingerprints or other identifiers of certain agents or other systems which accessed or attempted to access their corresponding assets. Some such systems may be known to be used for inbound network traffic. As a non-limiting example, the access logs may contain fingerprints of known Internet scanners which attempt to access assets during scanning. These fingerprints in the access logs may be utilized to identify code being executed on assets from inbound network traffic as discussed with respect to S350.

In an embodiment, S340 includes identifying the access logs among the network traffic data. In a further embodiment, the access logs are identified based on their formats. That is, the network traffic data may be analyzed with respect to predetermined formats known to be used for access logs in order to identify portions of data having these formats as access logs.

At S350, the access logs are analyzed in order to identify code executed on assets. In an embodiment, identifying code executed on the assets includes analyzing the access logs in order to identify one or more predetermined identifiers such as fingerprints which are associated with known scanners or other systems which attempt to access assets via the Internet or otherwise via inbound network traffic. As a non-limiting example, a predetermined fingerprint of an agent known to be a web crawler may be identified within the access logs based on a predetermined list of such web crawler fingerprints. In an embodiment, code being executed on a given asset by such a system known to access assets via inbound network traffic may serve as evidence that the asset is network-facing and accessible via inbound network traffic.

At S360, network certificates owned by assets are identified. In an embodiment, the network certificates are identified based on traffic data for responses returned by assets. Such responses may include network certificates when an asset is network-facing, that is, when such a network certificate is used to authenticate the asset during network communications or otherwise to represent the asset in such network communications. As a non-limiting example, ownership of a cryptographic certificate by a given asset may act as evidence that the asset is network facing and may be accessible via inbound network traffic.

Figure 4:
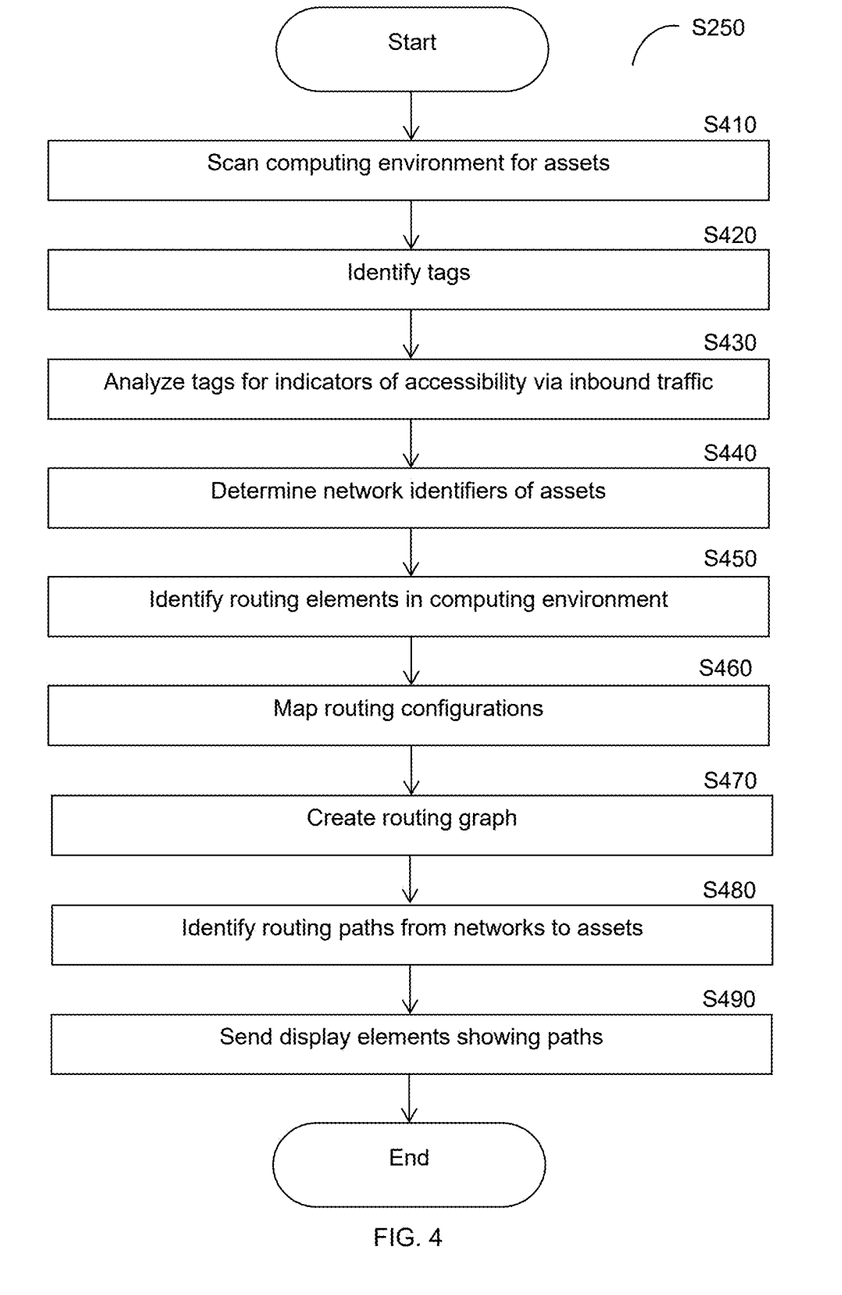
FIG. 4 is a flowchart illustrating a method for analyzing network configurations for assets according to an embodiment.

FIG. 4 is a flowchart S250 illustrating a method for analyzing network configurations for assets according to an embodiment.

At S410, a computing environment is scanned for assets. Data sources for data related to the assets may be identified during this scan.

At S420, tags of assets are identified. The tags are metadata associated with respective assets. In an embodiment, the identified tags include tags indicating whether their associated assets are network-facing.

At S430, the tags are analyzed for indicators of accessibility via inbound network traffic. In an embodiment, the tags are analyzed for predetermined strings or other data known to be indicative of network-facing assets such as, but not limited to, "Internet-facing," "network-facing," "Internet accessible," "accessible to external networks," and the like.

In this regard, it is noted that, at least in some implementations, users or managers of the assets in a given computing environment may be allowed to label assets as either network-facing or not network-facing, for example using tags. These tags may therefore serve as evidence of whether assets are network-facing. However, it is further noted that such tags may be outdated, for example, a tag may initially indicate that an asset is network-facing before the asset is disconnected from any paths to external networks such that the asset ceases being network-facing. Such manually created tags may therefore not be up-to-date at all times such that relying solely on such tags for detecting network-facing assets would yield false positives and/or false negatives. The disclosed embodiments, which utilize multiple indicators of inbound network traffic accessibility and in particular a combination of static configuration-based indicators and dynamic traffic-based indicators, allow for confirming that the tags are correct and up-to-date with better accuracy than relying on tag-based indicators alone.

At S440, network identifiers of the assets are determined. The network identifiers may be or may include network addresses or other identifiers used to identify the assets in network communications. Such network identifiers may be or may include, but are not limited to, Internet Protocol (IP) addresses, virtual IP addresses, and the like.

At S450, routing elements within the computing environment are identified. The routing elements may be or may include, but are not limited to, routers, firewalls, load balancers, intrusion prevention systems (IPSs), intrusion detection systems (IDSs), application programming interface (API) gateways, content delivery networks (CDNs), web application firewalls (WAFs), combinations thereof, and the like. In some embodiments, the routing elements may be identified based on results of the scan performed at S410.

At S460, the routing configurations are mapped. More specifically, data of the routing elements may be analyzed in order to identify other routing elements, networks, assets, or other systems to which each routing element has established connections. These established connections are utilized to map connections between routing elements and such other systems. The mappings, in turn, may be utilized to identify routing paths between external networks and assets.

In some embodiments, mapping the routing configurations includes making one or more attempts to access servers within the computing environment via routing elements in the computing environment. In a further embodiment, initial mapping may be performed in order to identify one or more suspected routing paths to a server from an external network, and an attempt to access the server may be made through an external network (for example, via the Internet). Such a suspected routing path may proceed through one or more routing elements but may lack data explicitly indicating connections to certain servers such that the suspected routing paths cannot be definitively confirmed as being used for access via inbound network traffic based on configuration data alone. That is, testing suspected routing paths may allow for unearthing paths from external networks to assets which are not explicitly represented in network configuration data.

In this regard, it is noted that attempting to access a server through an external network in an external network access test in this manner may allow for validating suspected routing paths, that is, confirming that a suspected routing path allows for accessing a given server. Assets managed by or otherwise accessible to servers who are accessed through this external network access test may be confirmed as being accessible via inbound network traffic. That is, the indicators of those assets used for generating likelihood scores as described herein may be strengthened, for example, by determining higher values for those indicators when those assets are successfully accessed via such a test.

At S470, a routing graph is created based on the mapped routing configurations. In an embodiment, the routing graph includes nodes representing entities within or communicating with a computing environment such as, but not limited to, assets, servers, routing elements, networks, combinations thereof, and the like. In a further embodiment, the routing graph also includes edges representing connections between those entities such as connections used to communicate data between the entities.

At S480, one or more routing paths are identified from external networks (i.e., networks which are external to the computing environment) to assets within the computing environment. In an embodiment, each routing path includes multiple nodes connected by edges starting with a node representing an external network and ending with a node representing an asset. Such a routing path may include one or more nodes representing routing elements used to route traffic from the external network and one or more nodes representing servers used to access the assets. Accordingly, a routing path leading from an external network to an asset may serve as evidence indicating that the asset is network-facing and accessible via inbound network traffic.

In this regard, it is noted that routing elements or other systems used to facilitate network access may not be capable of distinguishing between inbound network traffic transmitted to the computing environment via external networks and internal traffic between and among components of the computing environment. Accordingly, data from these routing elements may not accurately represent where traffic originated from relative to the computing environment (for example, either originating inside or outside of the computing environment). Mapping paths between routing elements may therefore allow tracing of potential inbound network traffic from networks to assets, which in turn may be utilized to improve accuracy of network-facing asset detection.

At optional S490, one or more display elements showing the identified paths may be generated and sent for display, for example to a user device of an administrator of a computing environment in which one or more of the detected network-facing assets are deployed. The display elements may be or may be used to generate, for example but not limited to, graphical user interface (GUI) elements to be displayed via a GUI of a user device. In a further embodiment, the display elements further show identifiers of routing elements, assets, networks, or other components along the identified paths. These display elements may therefore provide administrators with additional data showing the relationship between the assets and external networks which may help contextualize the exposure of those assets.

Figure 5:
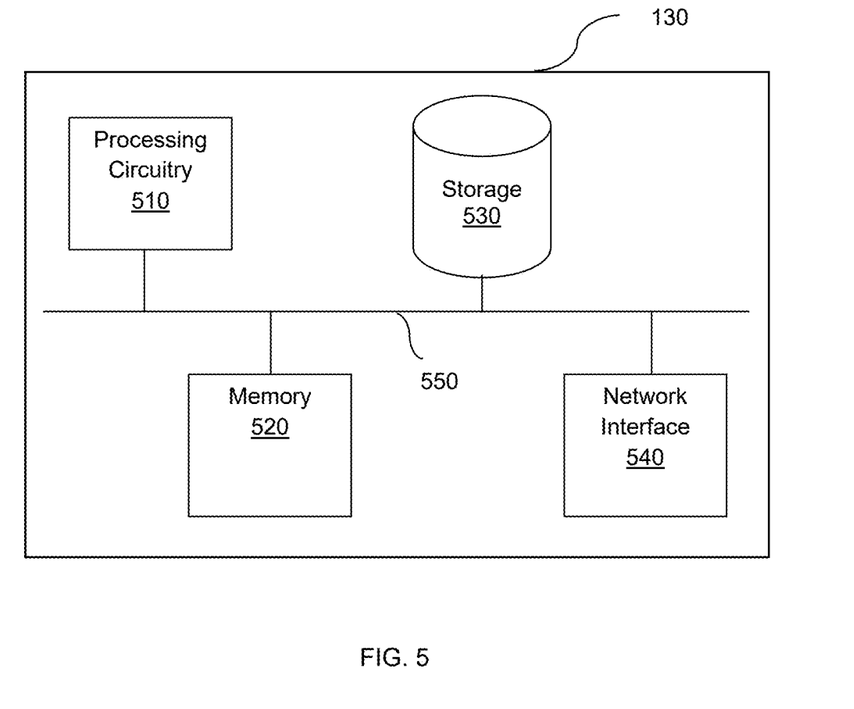
FIG. 5 is a schematic diagram of a detector according to an embodiment.

FIG. 5 is an example schematic diagram of a detector 130 according to an embodiment. The detector 130 includes a processing circuitry 510 coupled to a memory 520, a storage 530, and a network interface 540. In an embodiment, the components of the detector 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the detector 130 to communicate with other systems, devices, components, applications, or other hardware or software components, for example as described herein.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for exposure remediation, comprising:
analyzing access logs for a plurality of assets deployed in a computing environment with respect to network traffic in order to identify an indicator of at least one network access event involving an inbound connection of at least one inbound connection to at least one external network, wherein the at least one external network is external to the computing environment, wherein the inbound connection of each network access event includes at least a portion of the network traffic being transmitted to the computing environment from the at least one external network;
analyzing a plurality of network configurations of the plurality of assets in order to identify at least one indicator of a network configuration which enables at least a portion of the plurality of assets to be accessed with the at least one external network;
detecting at least one network-facing asset among the plurality of assets based on the network traffic and the plurality of network configurations of the plurality of assets, wherein each network-facing asset is accessible via the at least one inbound connection and the at least one external network, wherein the at least one network-facing asset is detected based further on a time of each of the at least one network access event and a time of analyzing the plurality of network configurations; and
remediating at least one exposure with respect to the detected at least one network-facing asset.

2. The method of claim 1, further comprising:
creating a routing graph, wherein the routing graph represents connections between the plurality of assets and a plurality of routing elements, wherein the routing graph further represents connections between the plurality of routing elements and the at least one external network, wherein the at least one network-facing asset is detected based further on the routing graph.

3. The method of claim 2, further comprising:
identifying at least one path between the plurality of assets and the at least one external network, wherein the at least one network-facing asset is detected based further on the identified at least one path.

4. The method of claim 3, further comprising:
generating at least one display element showing the identified at least one path; and
sending the at least one display element for display via a user interface.

5. The method of claim 1, further comprising:
identifying the inbound connection of each of the at least one network access event based on a network address of a source of the at least a portion of the network traffic being transmitted to the computing environment from the at least one external network.

6. The method of claim 1, further comprising:
identifying at least one set of code executed on at least one asset of the plurality of assets based on the analyzed access logs; and
identifying at least one matching fingerprint of the at least one set of code executed on the at least one asset, wherein each matching fingerprint matches a fingerprint of a respective network scanner of a plurality of network scanners, wherein the at least one network-facing asset is detected based further on the identified at least one matching fingerprint.

7. The method of claim 1, further comprising:
identifying at least one network certificate for the plurality of assets, wherein the at least one network-facing asset is detected based further on the identified at least one network certificate.

8. The method of claim 1, wherein the plurality of network configurations of the plurality of assets includes a plurality of tags, wherein at least a portion of the plurality of tags indicate that at least one asset of the plurality of assets is network-facing, wherein the at least one network-facing asset is detected based further on the at least a portion of the plurality of tags which indicate that the at least one asset is network-facing.

9. The method of claim 1, wherein the plurality of network configurations of the plurality of assets include at least one network identifier owned by at least one asset of the plurality of assets, wherein the at least one network-facing asset is detected based further on the at least one network identifier owned by the at least one asset.

10. A non-transitory computer-readable medium having stored thereon instructions for causing a processing circuitry to execute a process, the process comprising:
analyzing access logs for a plurality of assets deployed in a computing environment with respect to network traffic in order to identify an indicator of at least one network access event involving an inbound connection of at least one inbound connection to at least one external network, wherein the at least one external network is external to the computing environment, wherein the inbound connection of each network access event includes at least a portion of the network traffic being transmitted to the computing environment from the at least one external network;
analyzing a plurality of network configurations of the plurality of assets in order to identify at least one indicator of a network configuration which enables at least a portion of the plurality of assets to be accessed with the at least one external network;
detecting at least one network-facing asset among the plurality of assets based on the network traffic and the plurality of network configurations of the plurality of assets, wherein each network-facing asset is accessible via the at least one inbound connection and the at least one external network, wherein the at least one network-facing asset is detected based further on a time of each of the at least one network access event and a time of analyzing the plurality of network configurations; and remediating at least one exposure with respect to the detected at least one network-facing asset.

11. A system for exposure remediation, comprising:
a processing circuitry; and
a memory, the memory containing instructions that, when executed by the processing circuitry, configure the system to:

analyze access logs for a plurality of assets deployed in a computing environment with respect to network traffic in order to identify an indicator of at least one network access event involving an inbound connection of at least one inbound connection to at least one external network, wherein the at least one external network is external to the computing environment, wherein the inbound connection of each network access event includes at least a portion of the network traffic being transmitted to the computing environment from the at least one external network;

analyze a plurality of network configurations of the plurality of assets in order to identify at least one indicator of a network configuration which enables at least a portion of the plurality of assets to be accessed with the at least one external network;

detect at least one network-facing asset among the plurality of assets based on the network traffic and the plurality of network configurations of the plurality of assets, wherein each network-facing asset is accessible via the at least one inbound connection and the at least one external network, wherein the at least one network-facing asset is detected based further on a time of each of the at least one network access event and a time of analyzing the plurality of network configurations; and remediate at least one exposure with respect to the detected at least one network-facing asset.

12. The system of claim 11, wherein the system is further configured to:
create a routing graph, wherein the routing graph represents connections between the plurality of assets and a plurality of routing elements, wherein the routing graph further represents connections between the plurality of routing elements and the at least one external network, wherein the at least one network-facing asset is detected based further on the routing graph.

13. The system of claim 12, wherein the system is further configured to:
identify at least one path between the plurality of assets and the at least one external network, wherein the at least one network-facing asset is detected based further on the identified at least one path.

14. The system of claim 13, wherein the system is further configured to:
generate at least one display element showing the identified at least one path; and
send the at least one display element for display via a user interface.

15. The system of claim 11, wherein the system is further configured to:
identify the inbound connection of each of the at least one network access event based on a network address of a source of the at least a portion of the network traffic being transmitted to the computing environment from the at least one external network.

16. The system of claim 11, wherein the system is further configured to:
identify at least one set of code executed on at least one asset of the plurality of assets based on the analyzed access logs; and
identify at least one matching fingerprint of the at least one set of code executed on the at least one asset, wherein each matching fingerprint matches a fingerprint of a respective network scanner of a plurality of network scanners, wherein the at least one network-facing asset is detected based further on the identified at least one matching fingerprint.

17. The system of claim 11, wherein the system is further configured to:
identify at least one network certificate for the plurality of assets, wherein the at least one network-facing asset is detected based further on the identified at least one network certificate.

18. The system of claim 11, wherein the plurality of network configurations of the plurality of assets includes a plurality of tags, wherein at least a portion of the plurality of tags indicate that at least one asset of the plurality of assets is network-facing, wherein the at least one network-facing asset is detected based further on the at least a portion of the plurality of tags which indicate that the at least one asset is network-facing.

19. The system of claim 11, wherein the plurality of network configurations of the plurality of assets include at least one network identifier owned by at least one asset of the plurality of assets, wherein the at least one network-facing asset is detected based further on the at least one network identifier owned by the at least one asset.

* * * * *